United States Patent [19]

Dorosz

[11] Patent Number: 4,879,732
[45] Date of Patent: Nov. 7, 1989

[54] ODOMETER WITH DISTANCE TRAVELED AND DISTANCE REMAINING DISPLAYS

[76] Inventor: Zbigniew Dorosz, 3 Barkly Avenue, Richmond, Victoria, Australia

[21] Appl. No.: 99,544

[22] Filed: Sep. 22, 1987

[30] Foreign Application Priority Data

Sep. 22, 1986 [AU] Australia .............................. PH8160

[51] Int. Cl.$^4$ .............................................. G01C 22/00
[52] U.S. Cl. .................................. 377/24.2; 377/24.1; 377/112
[58] Field of Search ...................... 377/24.1, 24.2, 112

[56] References Cited

U.S. PATENT DOCUMENTS

| | | | |
|---|---|---|---|
| 4,044,471 | 8/1977 | Peterson | 377/24.1 |
| 4,053,755 | 10/1977 | Sherrill | 377/24.2 |
| 4,263,657 | 4/1981 | Oka et al. | 377/24.1 |
| 4,532,710 | 8/1985 | Kinney et al. | 377/24.1 |
| 4,685,116 | 8/1987 | Toumayan | 377/24.1 |

Primary Examiner—John S. Heyman
Attorney, Agent, or Firm—Scully, Scott, Murphy & Presser

[57] ABSTRACT

A portable, self-contained, programmable odometer for attachment to a golf buggy of the type which is wheeled around a golf course by a user, has independent up and down counters which derive data about the distance covered by the buggy from the movement of the buggy. The up counter counts and displays the distance travelled from where a golf ball is hit to where it lands. The up counter may be reset to zero at any time, for example when the ball is reached, without affecting the down counter. The reset operation may be effected a number of times as it may take several drives to reach the green from the tee. The down counter is programmable. It counts and displays the distance to the hole, the tee to hole distance being programmable into the down counter at the start of each hole.

8 Claims, 10 Drawing Sheets

FIG. 1.

FIG. 2. LEFT

Fig. 3.

FIG. 4. RIGHT

FIG. 6.

ODOMETER WITH DISTANCE TRAVELED AND DISTANCE REMAINING DISPLAYS

This invention relates to an odometer.

BACKGROUND OF THE INVENTION

Whilst the distance between the tee and the hole of a particular golf course hole is normally a published fact, it is of importance to a golfer to know, after an initial drive of a golf ball from the tee, how far it is from the lie of the ball to the hole. It is further of interest to a golfer to know how far the ball was driven in that drive.

SUMMARY OF THE INVENTION

Accordingly, the present invention provides a golf odometer mounted or adapted to be mounted to a golf buggy and adapted to drive input from movement of the golf buggy and wherein the odometer is adapted to have a representation of a distance input thereto by a user and such that, when the golf buggy is moved along the length of a golf hole, to apply said input to decrementing said representation of a distance and to display a representation of the decremented distance.

From the above it will be appreciated that a golfer may input a distance from a tee to a hole and in moving between that tee and that hole maintain a representation of the distance of where he is at any one time with respect to that hole.

The odometer may additionally be adapted to display a representation of the distance that the golf buggy has moved from a predetermined starting point to another point.

The odometer may be calibrated in units of yards or meters and preferably is switch selectable between such units.

The odometer may derive input from rotation of a wheel of the golf buggy.

Since different makes of golf buggys come with different diameter wheels, it is preferred that the odometer is provided with adjustment means to enable suiting to different diameter wheels.

The odometer preferably includes mounting means for mounting the odometer to a golf buggy.

The odometer preferably include an input device adapted to be associated with a wheel of a golf buggy or to another wheel forming part of the odometer itself.

BRIEF DESCRIPTION OF THE DRAWINGS

Two specific constructions of odometers in accordance with this invention will now be described with reference to the accompanying drawings in which.

DETAILED DESCRIPTION OF THE PREFERRED EMBODIMENT OF FIGS. 1-4

The first odometer of FIGS. 1-4 utilizes discrete integrated circuits to form the various logic functions required. The second odometer of FIG. 6 uses a microprocessor based odometer. A Liquid Crystal Display, displays distances to a golf hole (an end point) and from a starting point, and reset and data entry functions are implemented via a keypad.

PRINCIPLE OF OPERATION, FIRST ODOMETER

The principle of operation of the first golf buggy odometer shown in FIGS. 1-4 involves electronically sensing the revolutions made by one of the golf buggy's wheels. Each revolution is electronically converted into a measure of distance travelled. The measure of distance travelled is based upon knowledge of the circumference of the golf buggy's wheels.

The summation of distances travelled per revolution, gives a measure of total distance travelled by the golf buggy. A reset button is used to initialize the electronic summation circuitry to zero prior to departure from the start point.

Subtracting the distances travelled from a value entered into the odometer, gives a measure of distance remaining to be travelled to the end point. The value entered into the odometer, prior to departure from the start point, is equal to the distance of separation between the start and end points.

Three Binary Coded Decimal (BCD) thumbwheel switches are used to select the distance of separation, between the start and end points. The maximum distance of separation, that can be entered is 999 yards, or meters. A push button performs the enter function.

Two banks of three Light Emitting Diodes (LED's) displays are used to indicate the distance travelled and the distance remaining to be travelled, by the golf buggy. The maximum range of each display is 000 to 999. A variation in the circuitry submitted allows the use of Liquid Crystal Displays (LCD's) to replace the Light Emitting Diode displays. The LCD odometer is the low powered version of the LED odometer.

The odometer is designed to operate on any golf buggy, with wheel sizes up to a diameter of about 600 mm (about 25 inches) Calibration switches allow the odometer to be matched to the golf buggy's wheels. The accuracy of measurement is +/- one wheel revolution.

A switch allows the distances indicated to be displayed in either meters or yards. The unit of measurement is preselected prior to the measuring process.

The odometer is battery operated and requires a single 9 volt transistor battery.

1. CIRCUIT DESCRIPTION

The Electronic odometer consists of eight basic electronic functions. These are the Input Mono-Stable, a Set/Reset Flip Flop, a Pulse Generator, Distance Conversion Network, a Pulse Counter, Up and Down Counters and Display Circuitry.

The Input Mono-Stable produces an initialization pulse for each revolution of the golf buggy's wheels. The Set Reset Flipflop, the Pulse Generator and Pulse Counter combine to process a further predetermined number of pulses upon the generation of the initialization pulse. The pulses produced being equal, in number, to the number of millimeters around the circumference of the golf buggy's wheels. Two decade dividers convert the millimeters travelled per revolution into either centimeters or tenths of yards travelled.

An Up-Counting BCD counter sums the pulses from the decade counters. Internally the BCD counter performs a further division by ten. The BCD counter is updated after every meters or yard travelled. The counts summed by the BCD up-counter are displayed on either a three digit, Liquid Crystal and Light Emitting Diode, display, giving a measure of distance travelled.

A BCD Down-Counter subtracts each pulse, received from the two decade dividers, from a pre-set value. The preset value, loaded in via thumbwheel switches, is equal to the distance in yards or meters between the start and end points. The difference obtained is further divided by ten, within the Down-Counter, and the result displayed on a three digit display. The display used being similar to that used by the Up-Counter.

1:1. THE INPUT PULSE MONO-STABLE

The Input Mono-Stable ensures that only one initialization pulse is produced for each revolution made by the golf buggy's wheels. Should a switch type, wheel revolution sensor be used, multiple pulsing can occur as the switch contacts open and close. This effect is known as point bounce. The Input Mono-Stable prevents this effect from occurring. A further feature of the Input Mono-Stable is that it responds only to an increasing voltage signal, not a steady state signal. This features is necessary in order to prevent continuous pulse generation from the Pulse Generation circuitry. Such a phenomena would occur if the golf buggy stopped in a position with the revolution sensor continuously active.

1:1:1. INPUT PULSE MONO-STABLE DESCRIPTION OF OPERATION

Normally both inputs of the Input Mono-Stable are held at a logic "low" voltage level by resistors R1 and R2. The logic element of the Input Mono-Stable is that of a NAND Schmitt trigger. With both inputs logic "low", its output is logic "high".

A positive going input voltage when applied to resistor R1 is also momentarily applied to resistor R2, because of the low impedance of the uncharged capacitor C1. With both inputs high, the output of the Input Pulse Mono-Stable switches to a logic "low" voltage level. Capacitor C1 then charges up through resistor R2, eventually taking the voltage at the junction of R2 and C1 below the lower threshold trigger voltage level of the Schmitt Trigger. At this point the output of the Input Mono-Stable then switches back to its normal output "high" logic voltage level. The period for which the output of the "NAND" Schmitt trigger is low is determined by the expression;

Period of Pulse=R1*C1.

No further output pulses can occur while the voltage across capacitor C1 exceeds the upper threshold trigger voltage for the Schmitt Trigger.

1:2. SET/RESET FLIP-FLOP.

The function of the Set Reset Flip Flop is to control the operation of the Pulse Generator and reset the Pulse Counter. The Set/Reset Flip-Flop is constructed around two logic "NAND" Schmitt triggers.

The Set/Reset Flip-Flop has two inputs and two outputs. A negative going pulse, when applied to the "SET" input of the Flip-Flop, causes its Q1 and Q2 outputs to simultaneously go to logic "high" and "low" voltage levels, respectively. A negative going pulse, when applied to the "RESET" input, causes the Flip Flop outputs to simultaneously revert to their original conditions.

The Q1 and Q2 outputs of the Flip Flop, when taken high and low respectively, enable both the Pulse Generator and the Pulse Counters simultaneously. Similarly when the Q1 and Q2 outputs are taken low and high respectively, the Pulse Generator is disabled and the Decade Counters of the Pulse Counter are reset.

1:3. PULSE GENERATOR

The Pulse Generator produces high frequency pulses when activated by the Set-Reset Flip Flop. The frequency of the pulses is determined by a number of factors. The principal factor being sufficient pulses are to be produced between consecutive wheel revolutions, at maximum wheel revolution rates, to ensure correct counter increments occur. For a maximum wheel revolution rate, at maximum wheel diameter, sufficient pulses must be produced to match the number of millimeters on the wheels circumference per wheel revolution. A frequency of 5 KHz was selected.

1:3:1. DESCRIPTION OF OPERATION OF THE PULSE GENERATOR

The Pulse Generator consists a two input "NAND" Schmitt Trigger, a resistor R5 and a capacitor C2. Resistor R5 and capacitor C2 form the charge/discharge path for the oscillator.

In the oscillator's disabled mode, its output is normally at a logic "high" voltage level. This occurs while the the Set/Reset Flip-Flop's output, Q1, is low. The second input of the Pulse Generator is connected via feedback resistor R5 to its output. Because the output is at a logic "high" voltage level, capacitor C2 is fully charged.

When the Q1 output of the Set/Reset Flip-Flop switches to a "high" logic level, the Pulse Generator is enabled and its output switches to a logic "low" voltage level. Capacitor C2 discharges through resistor R5 until the voltage at the junction of capacitor C2 and Resistor R5 drops below the "low" trigger voltage of the Schmitt Trigger. At this point the Pulse Generator switches back to a logic "high" output voltage. Capacitor C2 then commences to charge up via Resistor R5 until the "high" trigger voltage of the Schmitt Trigger is reached. The output of the Pulse Generator then switches to a "low" voltage level. This process continues while the Set/Reset Flip-Flop output is "high".

1:4. PULSE COUNTER

The function of the Pulse Counter is to ensure that the Pulse Generator operates for a sufficient period of time to produce the required number of pulses to match the number of millimeters in circumference of the golf buggy's wheels. Three programmable Decade Counter/Dividers and three decade slider switches perform this function. The decade slider switches determine the number of pulses produced enabling selection of wheel circumferences of 1 to 999 millimeters. The outputs of the slides switches are logically "AND-ed" to ensure that the correct count is obtained. The logically inversion of the result obtained is used to reset the Set/Reset Flip-Flop at the end of the count. The Set/Reset Flip Flop then resets the Pulse Counter is readiness for the next counting sequence.

1:4:1. PULSE COUNTER DESCRIPTION OF OPERATION

The Pulse Counter consists of three decade counter/-dividers. The counter/dividers perform the function of counting the number of pulses required to match the number of millimeters around the circumference of the golf buggy's wheels. The setting of switches SW-3, SW-2 and SW-1 determine the number of pulses to be counted. Switch SW-3 selects hundreds of millimeters, switch SW-2 selects tens of millimeters and SW-1 selects units of millimeters. Diodes D1, D2 and D3 and resistor R8 perform the function of logical "AND-ing" of the switch outputs. The outputs of the decade divider/counters are normally low, as is the output of the logical "AND-ing" circuitry. Only when all selected counter/divider outputs are simultaneously high will the logical "AND-ing" circuitry function. The logic level of this signal is inverted and resets the Set/Reset Flip-Flop, stopping the counting process.

1:5. DISTANCE CONVERSION NETWORK

During the counting sequence pulses from the Pulse Generator are also diverted to two other decade counter/dividers. The decade dividers perform the function of converting the units of circumference of the golf buggy wheels from millimeters to tens of centimeters. Logical "AND-ing" of the divide by 90 and divide by 2 outputs of the decade dividers performs the function of converting the units of circumference of the golf buggy wheels from millimeters to tenths of yards. Diodes D4, D5 and resistor R7 perform the logic "AND-ing" function of the counter/divider outputs necessary for converting meters into yards.

1:6. THE UP AND DOWN COUNTERS

The counter used in the golf buggy odometer can be programmed to performm either UP-counting or DOWN-counting modes. In the UP-counting mode pulses received from an external source are summed and the result displayed. In the DOWN-counting mode, the counter decrements the value displayed as each pulse is received. The initial value displayed is preloaded into the counter display registers and represents in either meters or yards the distance of separation of the start and end points.

1:6:1. THE DOWN COUNTER

The method of loading the DOWN-counter with an initial count value is accomplished via a three decade thumbwheel switch. The thumbwheel switch has three digits, allowing a count range of 000 to 999. A push button, upon being depressed, transfers the count to the down counter. The value selected is then displayed on the three left-hand LED digits of the front panel display.

During operation the value shown on the display is decremented one unit for each pulse received from the Distance Conversion Network. The reset push button can be depressed at any time during operation, as can the value shown on the thumbwheel switches be changed. The value shown on the switches is not transferred to the display until the reset button is depressed.

All leading zeros on the display are blanked out to conserve battery power. Values such as 000, 001, 012 etc selected on the thumb wheel switch appear on the display as blank, 1 and 12 respectively.

1:6:2 THE UP COUNTER

The up-counter is initialized to zero when its reset button is depressed. This can be done at any time during the operation of the counter. During a counting sequence, the up-counter singularly increments from zero, upon each pulse from the Distance Conversion Network. The three right-hand LED digits display the current count value. As is the case with the down-counter, all leading zeros are blanked out to conserve battery power.

2. THE ICM7217C COUNTERS

2:1. GENERAL DESCRIPTION

A pair of INTERSIL ICM7217 Up/Down Counter/-Display Drivers perform the principal counting functions described in this specification. Additional circuitry perform the reset functions and power supply regulation. A three segment Binary Coded Decimal thumbwheel switch is used for selecting the initial count input for the down counters. Two banks of three, Common Cathode, Light Emitting Diode displays providé a visual readout of the number contact closures detected by the counters.

2:1:1 DESCRIPTION OF OPERATION

In each of the ICM7217C's used in the up/down counter described in this report there are four state counters, four count registers and comparators, four display latches, one for units of counts, tens of counts, hundreds of counts and thousands of counts. Other features of the ICM7217C include a multiplexer, input-/output control and display logic control.

The value of the number of contact operations counted is stored in the four state counters. After each contact closure this value is updated. The count registers store the count value selected via the thumbwheel switches and is used for carrying out comparison. The display latches are used for controlling external display devices, transferring the value held in the counters to the displays. Finally the multiplexer, input/output control and display logic control circuitry control the interaction between the sections just mentioned.

2:1:2 ICM7217C REGISTERS

The ICM7217C is also provided with control inputs; these include three display controls, a register control, a latch control and an up/down count control.

The three display controls are the system reset, the counter load control and a display inhibit control. When the system RESET is selected, the counters are reset to zero as is the count shown on the display. This feature is utilized in the up counter described in this report.

The second display control is the COUNTER LOAD CONTROL and allows for the transfer of data from thumbwheel switches to the counters and displays. If this mode is selected during a counting sequence, the displays will initially show the count selected on the thumbwheel switches. As the the counters are decremented or incremented after the next contact closure, the display is updated. This feature is utilized in the down counter described in this specification.

The DISPLAY INHIBIT CONTROL disables the display segment drivers, thereby turning them off. When selected, the current drain on the battery can be reduced by nearly 98%. In this mode only the displays are inhibited, all other functions perform as normal. Upon re-enabling the displays, the up dated count can be observed. The count register is loaded with the value shown on the thumbwheel switches when the REGISTER CONTROL is selected. The value held in the count registers remains unchanged during counting. Associated with the count registers are four comparators. The function of this circuitry is to compare the value held by the counters with that of the count registers. When a comparison in counts occurs, external circuitry can be activated.

The LATCH CONTROL inhibits the updating of the displays during counting. Normally this feature is programmed such that the displays are able to update after each contact closure. In situations where contacts are operating at very high speeds, the count shown on the display would be a blur. In such cases this feature would be utilized with the display being update after every $n^{th}$ contact closure or manual command.

The UP/DOWN CONTROL is used to determine the direction of count.

:2 UP COUNTER RESET

The RESET input of the ICM72717C is susceptible to noise if its input rise time is less than about 500 uS. This problem is prevalent in situations where hardwiring is used. Lead capacitance associated with the hardwiring of the reset push-button at a distance from the reset input of the counter increases the rise time of the reset input pulse. This problem is overcome by placing Reset Mono-stable between the reset push-button and the counter reset input. The voltage rise time of the reset pulse from the monostable sufficiently high to overcome this problem. The REST Mono-stable consists of a dual input NAND Schmitt Trigger, capacitor C7 and Resistors R13 and R14.

2:2:1 UP COUNTER RESET-DESCRIPTION OF OPERATION

Normally both inputs of the Input Mono-Stable are held at a logic "low" voltage level by resistors R13 and R14. The logic element of the Input Mono-Stable is that of a NAND Schmitt trigger. With both inputs logic "low", its output is logic "high".

A positive going input voltage when applied to resistor R14 is also momentarily applied to resistor R13, because of the low impedance of the uncharged capacitor C7. With both inputs high, the output of the Input Pulse Mono-Stable switches to a logic "low" voltage level. Capacitor C7 then charges up through resistor R13, eventually taking the voltage at the junction of R13 and C7 below the lower threshold trigger voltage level of the Schmitt Trigger. At this point the output of the Input Mono-Stable then switches back to its normal output "high" logic voltage level. The period for which the output of the "NAND" Schmitt trigger is low is determined by the expression:

Period of Pulse=R13*C7.

No further output pulses can occur while the voltage across capacitor C7 exceeds the upper threshold trigger voltage for the Schmitt Trigger.

2:3 DOWN COUNTER RESET

The function of the of the Down Counter Reset is to initialize the count displayed to zero. This function is performed by depressing the Down Counter Reset push button. In order that extreneous pulses do not occur as the push button functions an input mono-stable is used. This device ensures that only one pulse is generated as the push button is depressed.

2:3::1 DOWN COUNTER RESET-DESCRIPTION OF OPERATION

Normally both inputs of the Input Mono-Stable are held at a logic "low" voltage level by resistors R11 and R12. The logic element of the Input Mono-Stable is that of a NAND Schmitt trigger. With both inputs logic "low", its output is logic "high".

A positive going input voltage when applied to resistor R12 is also momentarily applied to resistor R11, because of the low impedance of the uncharged capacitor C6. With both inputs high, the output of the Input Pulse Mono-Stable switches to a logic "low" voltage level. Capacitor C6 then charges up through resistor R11, eventually taking the voltage at the junction of R11 and C6 below the lower threshold trigger voltage level of the Schmitt Trigger. At this point the output of the Input Mono-Stable then switches back to its normal output "high" logic voltage level. The period for which the output of the "NAND" Schmitt trigger is low is determined by the expression:

Period of Pulse=R11*C6.

No further output pulses can occur while the voltage across capacitor C6 exceeds the upper threshold trigger voltage for the Schmitt Trigger.

2:4 LOADING STARTING COUNT

The distance of separation between the start and end points, between which the golf buggy is to travel, is selected via the three thumbwheel switches. The value selected is not loaded into the Down Counter registers until the Down Count Pushbutton is depressed. As the pushbutton is depressed a positive voltage level is applied to the Register Load input of the Down Counter. At this point the distance of separation between the start and end points is displayed on the Down Counter display.

2:5 DISPLAY ENABLE

The golf buggy odometer is provided with a function for inhibiting the operation of the two displays. By connecting 0 volts to the display control inputs of the counters the displays are activated. By applying a logic "high" voltage level to the display control, the displays are disabled.

2:6 SYSTEM REST

In order that an incorrect start-up count does not occurs after either the Up or Down counters have been reset, the Pulse Divider Network and the Distance Conversion Network also requires resetting. For this purpose when either the Down Counter or the Up Counter is reset both the Pulse Divider and Distance Conversion Networks are simultaneously reset. This is achieved by logically "NORing" the outputs of the Pulse Divider and Distance Conversion Network's mono-stables. The pulse obtained is applied to the reset inputs of the counter/dividers.

2:7 THUMBWHEEL SWITCHES DECODING

Figure 1:
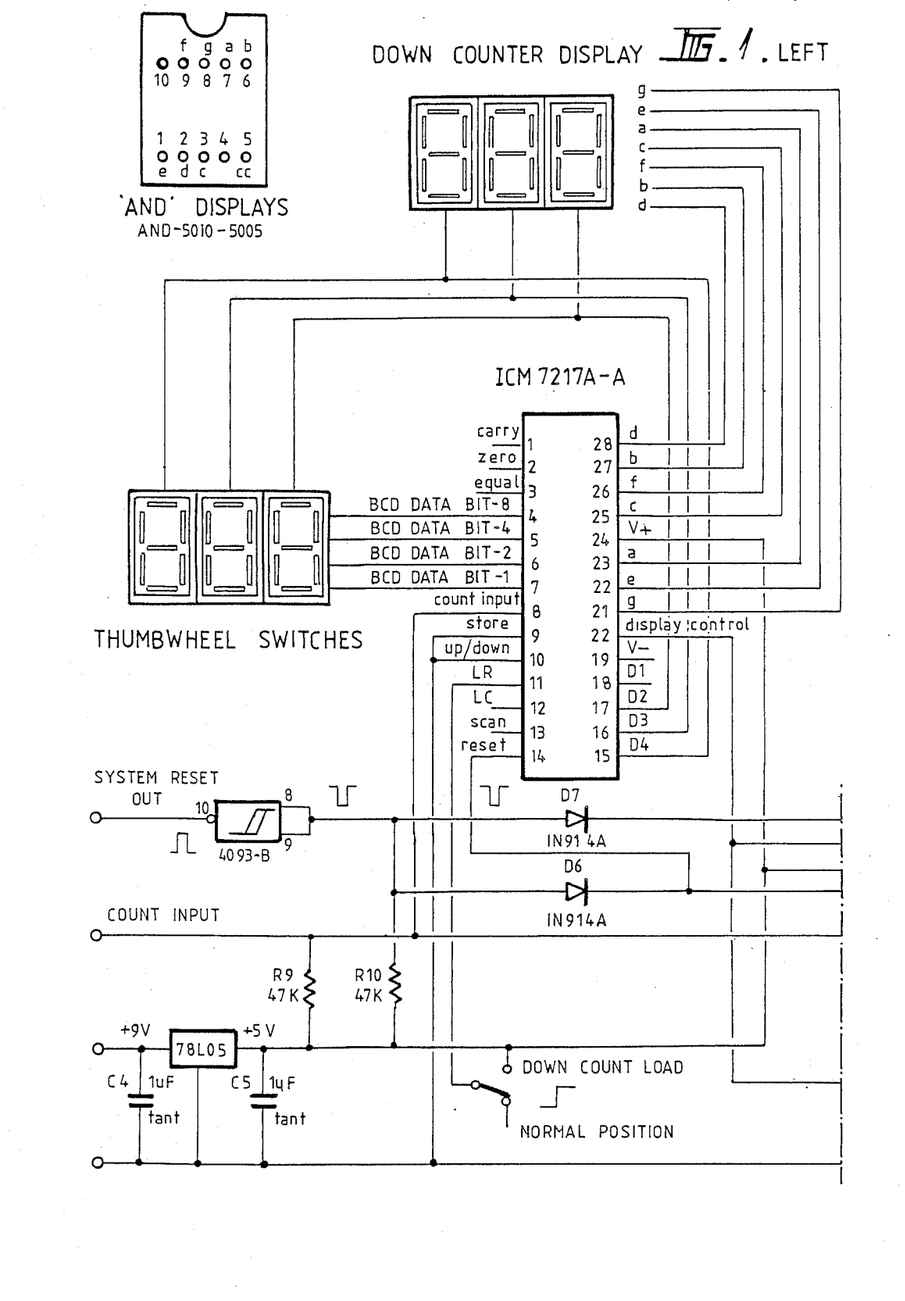
FIG. 1 is a circuit diagram of part of a first odometer.
Figure 2:
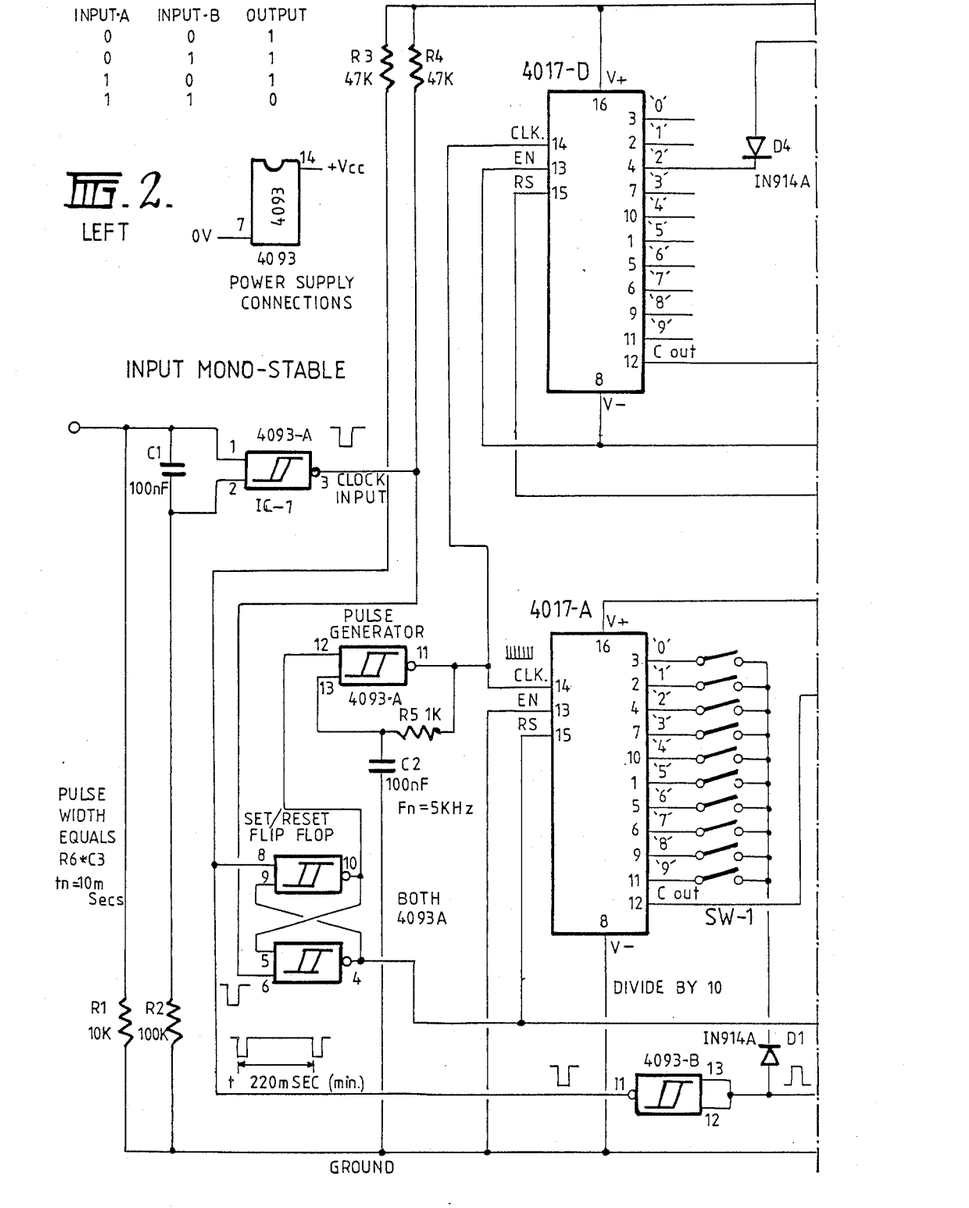
FIG. 2 is a circuit diagram of part of the first odometer.
Figure 3:
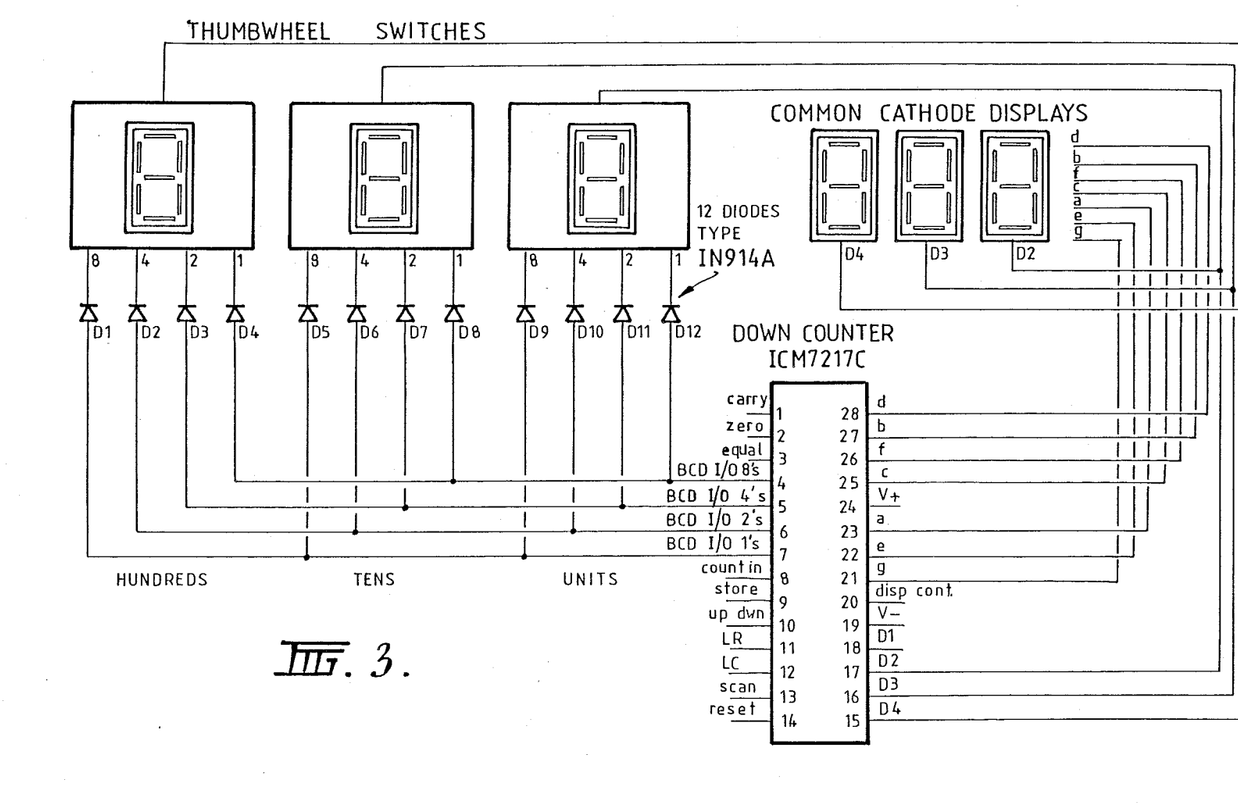
FIG. 3 is a circuit diagram of part of the first odometer.
Figure 4:
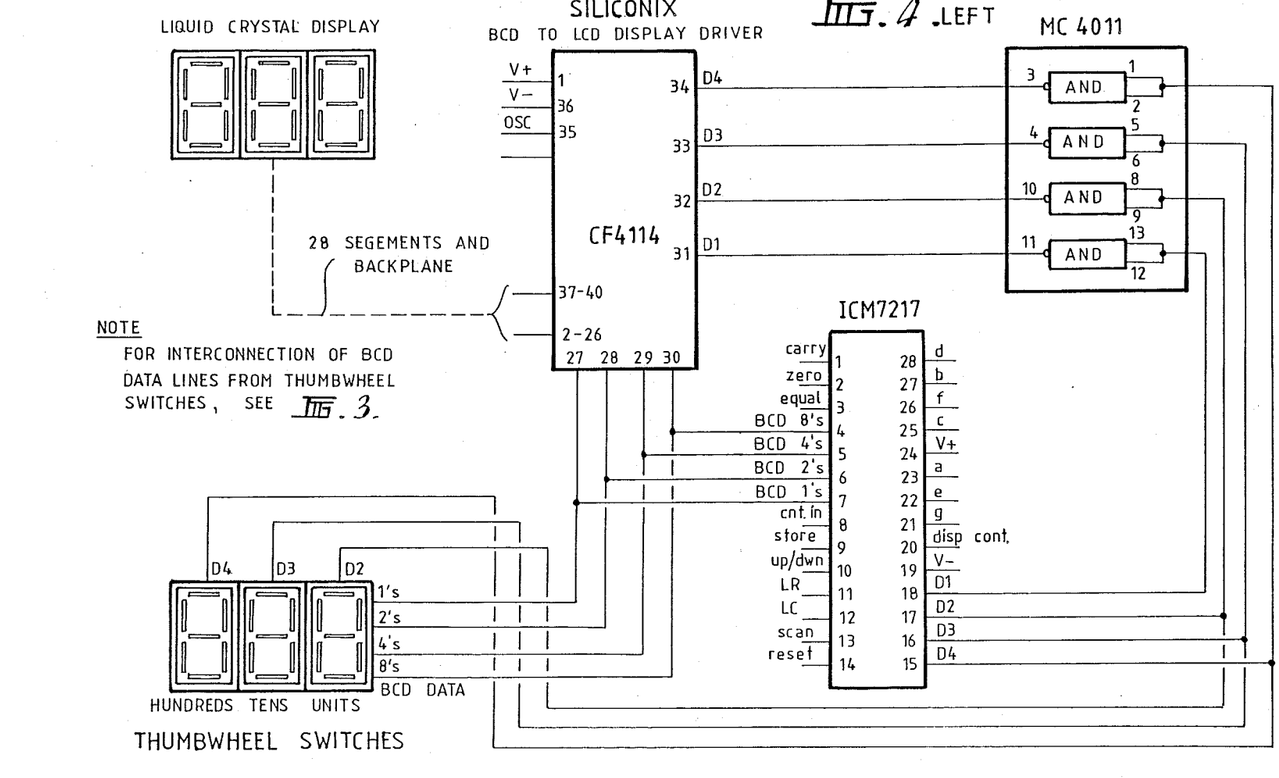
FIG. 4 is a circuit diagram of part of the first odometer.
Figure 5:
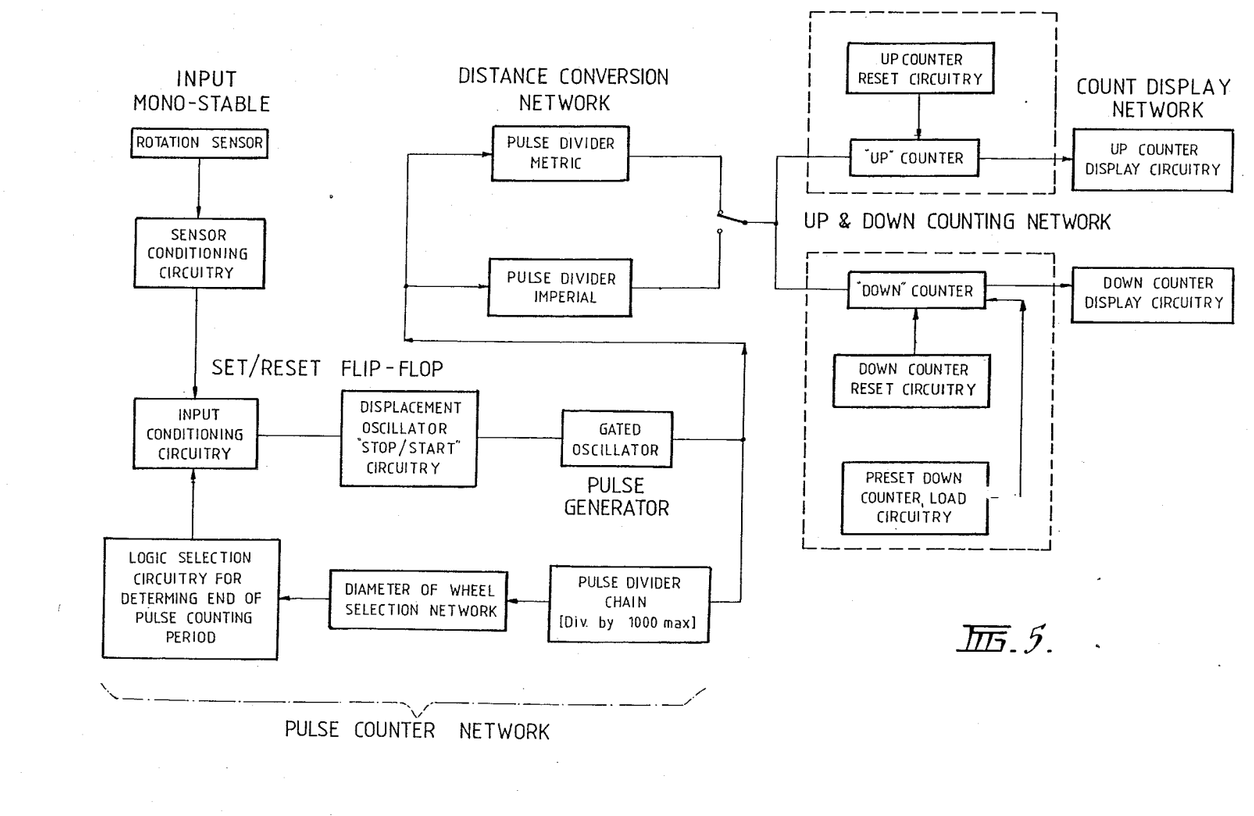
FIG. 5 is a block diagram of part of the first odometer.

The thumbwheel switches used on the down counter is are logic "true" 8CD coded types. Because the switches are connected in parallel, diodes are used to prevent cross talk between digits. In order to maintain minimum noise margins the diodes used should be low forward voltage types. FIG. 3 details the interconnection of the diodes and thumbwheel switches.

3 SYSTEM POWER SUPPLY

The golf buggy odometer is powered by a single 9 volt alkaline battery. The current drain on the battery is typically 60 mA's in a worse case condition with all digits showing 8's. In the display inhibit mode the current drops to approximately 2 mA's.

The Integrated circuits used in the odometer are low powered CMOS products. By operating at a 5 volts, power consumed by these products is reduced. To drop the terminal voltage of the battery from 9 volts to 5 volts, a National Semiconductor 78LG105 three terminal voltage regulator is used. Two 1 uF Tantulum capacitors are used to power supply oscillation and prevent voltage spikes.

4 DISPLAY BOARD

The outputs from the ICM7217C dispaly drivers are displayed on a two banks of three Light Emitting Diodes. The display chips used are AND-5010/5005, 12.7 mm numeric single common cathod light emitting diode display. Similar, pin compatible devices can be used.

5 MICROPOWERED MICROPROCESSOR GOLF BUGGY ODOMETER

Figure 6:
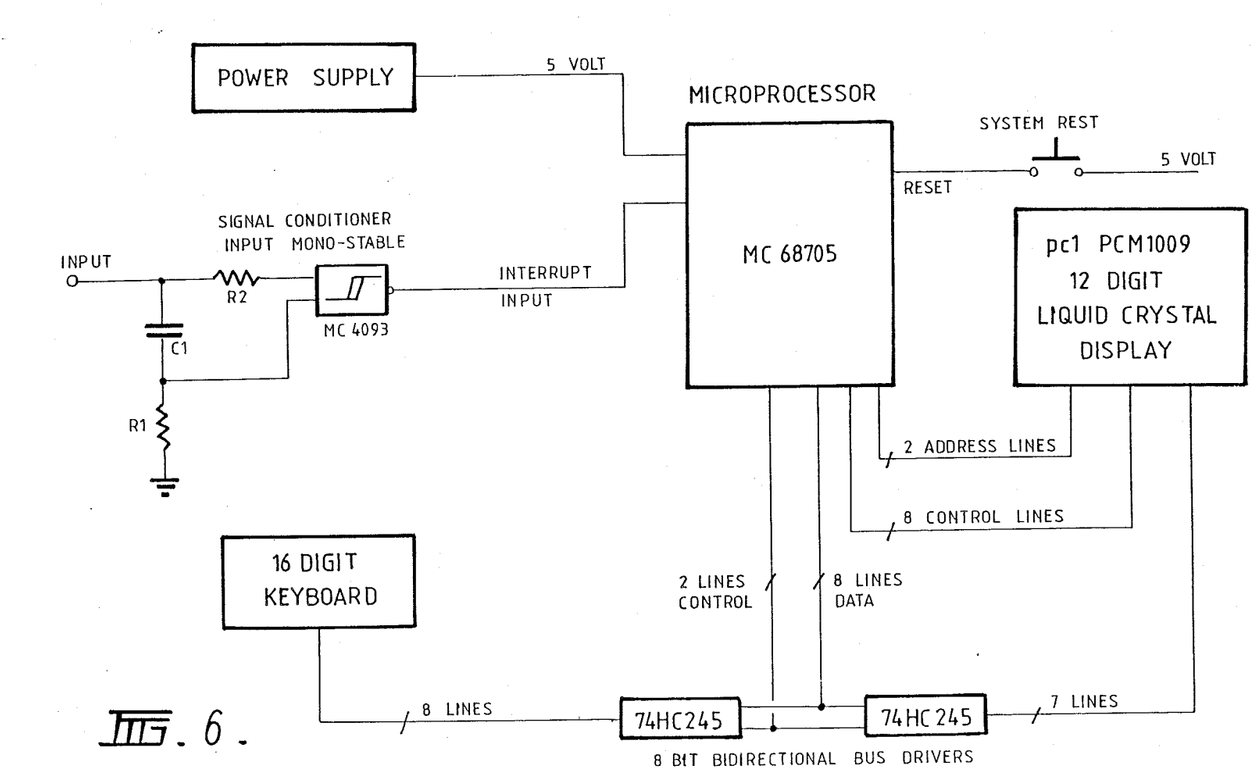
FIG. 6 is a block diagram of part of the second odometer.

The microprocessor golf buggy odometer of FIG. 6 described in the following utilizes a microprocessor to a brain similar measurement as the first odometer.

5:1 PRINCIPLE OF OPERATION, SECOND ODOMETER

The Micropowered Microprocessor golf buggy odometer is based upon the Motorols MC58705P3, 8 Bit, HMOS microprocessor. This device was selected because of its low power consumption and its ability to replace all hardware function, described earlier in this report, using software techniques.

All functions including Up-Counter reset, Down-Counter reset, loading of distance between start and end points and diameter of golf buggy wheels are implemented via a multiple-key keypad.

The display of distance travelled is achieved using a multiple digit Liquid Crystal Display.

5:2 The MC68705P3 MICROPROCESSOR

The Motorola MC68705P3 microprocessor has a Central Processor Unit, programmable memory (EPROM), read and write memory (RAM), a programmable timer, oscillator and 20 bidirectional input/output lines. The device comes in a 28 pin dual in line package.

5:3 THE ODOMETER SOFTWARE

The functions, utilizing logic integrated circuitry and described in detail in the previous section is performed using software and stored in Read Only Memory (EPROM).

5:4 BIDIRECTIONAL INPUT/OUTPUT LINES

The 20 bidirectional input/output lines are divided between the odometer display and keyboard utilizing a multiplexing technique. Eighteen output lines are required for servicing the Liquid Crystal Display. Eight input lines are required for servicing the keyboard. Two, 8 bit, bidirectional, data bus buffers allow one set of 8 data lines to be shared between the Keypad and display.

5:5 ODOMETER DISPLAY

The odometer display comprises a 12 digit, alphanumeric, Liquid Crystal Display. Each digit is individually addressable and hence ideally suitable for microprocessor control. The display has 7 data input lines, two address lines and eight function control lines. The seven data input lines are multiplexed with the eight data output lines from the key pad.

Use is made of the Alphanumeric capabilities of the display to provide intelligent "prompts" for the user.

5:5 THE KEYBOARD

The keyboard intended for use on the golf buggy odometer has 16 keys, ten are numeric, six are alpha characters. These being 1, 2, 3, 4, 5, 6, 7, 8, 9, 0. A, B, C, D, E, F respectively. The alpha characters are intended as control keys such as Up-Counter reset, Down-Counter reset, Down-Counter load, etc.

The odometer of the present invention is not confined for use on golf buggies of the type which may be wheeled by a user and may be applied to golf buggies of the type that are motorized and on which a user may ride; these are sometimes known as motorized golf carts.

Since modifications within the spirit and scope of the invention may be readily effected by persons skilled in the art, it is to be understood that the invention is not limited to the particular embodiment described, by way of example, hereinabove.

The claims defining the invention are claimed as follows:

1. A portable programmable, self-contained odometer for use on a wheeled golf buggy, said odometer being mounted or adapted to be mounted on said golf buggy, said odometer having input means for receiving data relating to the distance travelled by said golf buggy from a motion sensor associated with said buggy, said odometer deriving distance travelled from said data, said odometer including a resettable up counter for determining distance travelled, the output of said up counter being used to display distance travelled on a first portion of a display means, said up counter being able to be reset at any time to set the count thereof to zero, a programmable down counter for determining distance travelled from a predetermined value, the output of said down counter being used to display distance remaining to a predetermined point on a said second portion of said display means, said distance travelled and said distance remaining to a predetermined point being displayed simultaneously on said display means, said up counter and said down counter being independent of each other, whereby the distance count programmed into said down counter as displayed on said second portion of said display means remains undisturbed irrespective of the distance count or resetting of said up counter as displayed on said first portion of said display means.

2. An odometer as in claim 1 wherein said data relating to said distance travelled received by said odometer is obtained from a wheel of said golf buggy.

3. An odometer as claimed in claim 2, wherein means is provided to compensate for changes in wheel diameter.

4. An odometer as in claim 1 wherein said first portion of said display means comprises a first bank of one or more LEDs which receives the output of said up counter and displays said distance travelled and said second portion of said display means comprises a second bank of one or more LEDs which receives the output of said down counter and displays said distance remaining to a predetermined point.

5. A golf odometer as claimed in claim 4, including selecting means to enable each said display to be able to show distances in yards or meters.

6. An odometer as in claim 1 wherein said display means comprises a single bank of a number of LEDs, said first portion of said display means comprising one or more of said LEDs which receive the output of said up counter and display said distance travelled, said second portion of said display means comprising one or more of said LEDs not displaying said distannce travelled which receive the output of said down counter and display said distance remaining to a predetermined point.

7. An odometer as in claim 1 wherein said first portion of said display means comprises a first bank of one or more LCDs which receives the output of said up counter and displays said distance travelled and said second portion of said display means comprises a second bank of one or more LCDs which receives the output of said down counter and displays said distance remaining to a predetermined point.

8. An odometer as in claim 1 wherein said display means comprises a single bank of a number of LCDs, said first portion of said display means comprising one or more of said LCDs which receive the output of said up counter and display said distance travelled on one or more of said LCDs, said second portion of said display means comprising one or more of said LCDs not displaying said distance travelled which receive the output of said down counter and display said distance remaining to a predetermined point.

* * * * *

UNITED STATES PATENT AND TRADEMARK OFFICE
CERTIFICATE OF CORRECTION

PATENT NO. : 4,879,732

DATED : November 7, 1989

INVENTOR(S) : Zbigniew Dorosz

It is certified that error appears in the above-identified patent and that said Letters Patent is hereby corrected as shown below:

Column 1, line 66: delete "OF FIGS. 1-4"

Column 3, line 6: "and" should read as --or--

Column 4, line 63: "slides" should read as --slider--

Column 4, line 67: "is" should read as --in--

Column 5, line 35: "meters" should read as --metres--

Column 5, line 39: "performm" should read as --perform--

Column 6, line 22: "counters." should read as --counter.--

Column 6, line 39: "comparison" should read as --comparisons--

Column 9, line 38: "Motorols MC58705P3," should read as --Motorola MC68705P3,--

Column 11, line 20, Claim 6: "distannce" should read as --distance--

Signed and Sealed this

Ninth Day of July, 1991

Attest:

HARRY F. MANBECK, JR.

*Attesting Officer*       *Commissioner of Patents and Trademarks*